United States Patent
Connesson et al.

(10) Patent No.: US 10,214,965 B2
(45) Date of Patent: Feb. 26, 2019

(54) METHOD AND AN INSTALLATION FOR CUTTING UP A MASS OF REINFORCED CONCRETE

(71) Applicant: SOLETANCHE FREYSSINET, Rueil Malmaison (FR)

(72) Inventors: Micael Connesson, Rueil Malmaison (FR); Florian Termens, Rueil Malmaison (FR); Christophe Guillon, Rueil Malmaison (FR); Stephane Binon, Rueil Malmaison (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 760 days.

(21) Appl. No.: 14/620,450

(22) Filed: Feb. 12, 2015

(65) Prior Publication Data

US 2015/0226006 A1  Aug. 13, 2015

(30) Foreign Application Priority Data

Feb. 13, 2014 (FR) .................................... 14 51136

(51) Int. Cl.
*B28D 1/14* (2006.01)
*E21B 7/24* (2006.01)
*G21D 1/00* (2006.01)

(52) U.S. Cl.
CPC .................. *E21B 7/24* (2013.01); *B28D 1/14* (2013.01); *G21D 1/003* (2013.01); *Y02E 30/40* (2013.01)

(58) Field of Classification Search
CPC .. G21D 1/00; G21D 1/003; G21F 9/28; G21F 9/00; B28D 1/14; E21B 10/48; G21C 13/093

(Continued)

(56) References Cited

U.S. PATENT DOCUMENTS 3,033,298 A * 5/1962 Johnson ............... B23Q 9/0014
                                                              125/20
4,056,152 A * 11/1977 Lacey .................... B28D 1/041
                                                              125/20

(Continued)

FOREIGN PATENT DOCUMENTS

DE   199 06 722   8/2000
JP   2004-017535   1/2004

OTHER PUBLICATIONS

Search Report dated Nov. 4, 2014 from French Patent Application No. 1451136 filed Feb. 13, 2014, pp. 1-2.

*Primary Examiner* — Robert Rose
(74) *Attorney, Agent, or Firm* — MH2 Technology Law Group, LLP

(57) ABSTRACT

Disclosed are examples of methods and systems for cutting up a reinforced concrete mass, in which a drilling tool is provided. In various embodiments, the drilling tool comprises: a drill tube carrying a cutter member; a device for causing the drill tube to vibrate, the device comprising a vibration generator for generating longitudinal vibration in the drill tube; a device for injecting a drilling fluid at the distal end of the drill tube; and a device for moving the drill tube along its longitudinal direction. In the disclosed methods and systems, the reinforced concrete mass is cut up by drilling at least one hole with the help of the drill tool by causing the drill tube to vibrate while injecting the drilling fluid into the mass from the distal end of the drill tube.

19 Claims, 5 Drawing Sheets

(58) Field of Classification Search
USPC .................................................. 125/20, 12
See application file for complete search history.

(56) References Cited

U.S. PATENT DOCUMENTS

| | | | | |
|---|---|---|---|---|
| 4,625,707 A | * | 12/1986 | Whittaker | B23D 59/025 125/20 |
| 4,828,052 A | * | 5/1989 | Duran | B24B 1/04 175/55 |
| 4,832,411 A | * | 5/1989 | Johnston | B23D 57/0053 125/21 |
| 4,911,253 A | * | 3/1990 | Cliche | B23B 51/042 125/20 |
| 5,004,382 A | * | 4/1991 | Yoshino | B23B 51/042 125/20 |
| 2003/0111266 A1 | * | 6/2003 | Roach | B23Q 9/0078 175/57 |

* cited by examiner

METHOD AND AN INSTALLATION FOR CUTTING UP A MASS OF REINFORCED CONCRETE

CROSS-REFERENCE TO RELATED APPLICATIONS

This application claims priority of French Application No. 1451136 filed Feb. 13, 2014, the entire disclosure of which is hereby incorporated by reference in its entirety.

BACKGROUND OF THE INVENTION

The present invention relates to the field of dismantling structures, in particular dismantling containment buildings of a nuclear power station.

Traditionally, containment buildings of nuclear power stations are constituted by masses of reinforced concrete that are of considerable thickness. Certain masses may present lengths of concrete for drilling lying in the range 0.5 meters (m) to 30 m.

The term mass of "reinforced concrete" is used herein to designate a structure made of any kind of reinforced concrete, including metallic aggregate concrete, barytes concrete, or indeed prestressed concrete.

A specific feature of reinforced concrete is that it contains numerous reinforcing components, usually made of metal, such as prestress cables, steel bars, or any other metal reinforcement. Reinforced concrete thus presents high density. It is also very strong, presenting a breaking stress of the order of 40 megapascals (MPa) or more.

Operations of dismantling or destructuring a nuclear installation, including dismantling containment buildings of the installation, are thus generally lengthy and complex to undertake since they involve, cutting up reinforced concrete masses that are not only very thick but also very strong.

Among existing technologies, such as that described in DE 195 06 722, the use of diamond coring is known: a drill tube having a distal end fitted with an open cutter member is set into rotation in order to take a core out from the mass. After cores have beer, extracted, the portions of the mass situated between, the boreholes are cut up, e.g. by diamond wire sawing.

Such a method presents several drawbacks. In particular, it presents low efficiency and limited performance. In addition, it requires large quantities of water to be used to lubricate and cool the cutter member. Another drawback is that in the event of the cutter member losing teeth inside the borehole, it becomes very difficult, if not impossible, to continue drilling because of the hardness of the teeth of the critter member, which can neither be drilled nor destroyed.

OBJECT AND SUMMARY OF THE INVENTION

An object of the invention is to provide a method of cutting up a reinforced concrete mass, which method presents efficiency that is significantly better than that of prior art methods.

To do this, the invention firstly provides a cutting method for cutting up a reinforced concrete mass, the method comprising the following steps:
providing a drill tool comprising:
a drill tube having a longitudinal direction and presenting a distal end that carries a cutter member;
a device for causing the drill tube to vibrate, which device comprises a vibration generator for generating longitudinal vibration in the drill tube;
a device for injecting a drilling fluid into the mass at the distal end of the drill tube; and
a device for moving the drill tube in its longitudinal direction; and
cutting the reinforced concrete mass by drilling at least one bole with the help of the drill tool while causing the drill tube to vibrate with the help of the vibration generator and simultaneously injecting the drilling fluid into the mass at the distal end of the drill tube.

Drilling the hole by causing the drill tube to vibrate and thus causing the drill member to vibrate makes it significantly easier for the cutter member to penetrate into the mass, thereby reducing the time needed for cutting up the mass and for dismantling the containment of the nuclear power station.

As mentioned above, the term "reinforced concrete" covers any kind of reinforced concrete, in particular concrete having metallic aggregate, barytes concrete, and also prestressed concrete, and more generally any type of reinforced concrete having steel reinforcement.

The term "distal end" is used to mean the end of the drill tube that is remote from the device used for causing the drill tube to vibrate. The term "proximal end" is used to designate the end of the drill tube opposite from the distal end.

The device for causing the drill tube to vibrate is thus configured to generate longitudinal vibration in the drill tube. In other words, oscillations are generated along the longitudinal direction of the drill tube.

Advantageously, the vibration generator serves to generate a compression wave that propagates along the longitudinal direction of the drill tube from the device for causing the drill tube to vibrate to the cutter member.

Setting the cutter member into vibration delivers the energy needed for drilling the reinforced concrete, i.e. for drilling the concrete as such and also its metal reinforcement. It can thus be understood that the cutter member is caused to penetrate into the mass by axial hammering, as delivered by the longitudinal compression waves.

It can also be understood that because of the invention the cutting method can be continued even in the event of the cutter member losing teeth in the borehole: the effect of the cutter member coming into contact with a detached tooth is to set the detached tooth into vibration so that it can then continue to drill into the mass, to some extent. When drilling is performed by coring, the detached tooth can also be expelled into the drill tube because the core is destructured as a result of the vibration to which it is subjected.

In the prior art method, the core remains intact inside the drill tube and the detached tooth of the cutter member remains blocked ahead of the rotating cutter member, such that the other teeth come to rub against the detached tooth. This leads to premature wear of the other teeth of the cutter member.

One of the advantages of the invention is thus to avoid such a problem. By means of the invention, drilling can continue even in the event of the cutter member being damaged, in particular by losing some or ail of the teeth of the cutter member.

Thus, an advantage of the invention is that the method is robust in the face of the cutter member being damaged or lost in the borehole.

Another advantage of drilling using a vibrating tube is to limit tangential deflections of the drill tube. This phenomenon occurs when drilling with the help of a traditional rotary diamond drill bit because of the high speed of rotation, of the cutter member. It can thus be understood that unlike prior art methods, the method of the invention makes it possible in particular to ensure that drilling takes place in a straight line.

In order to cool the cutter member, a drilling fluid is used. By way of example, the drilling fluid is injected into the drill tube from its proximal end and continues towards its distal end when the cutter member is open.

Advantageously, the drilling fluid is a foam. The use of a foam presents several advantages: it enables the drill tube to be cooled, it lubricates the cutter member, and it serves to retain and convey the debris generated by the drilling. Another advantage of a foam is that it requires ten times less water than a conventional drilling fluid, or even less.

In a variant, air or water can be used, e.g. water atomized in a stream of air.

Advantageously, during drilling, the effluent constituted by a mixture of excavation debris and drilling fluid is recovered, the recovered effluent is treated, and the treated effluent is used, as drilling fluid.

It can thus be understood that the treated drilling fluid is immediately reinjected into the borehole, thereby advantageously serving to confine the drilling debris while limiting the quantity of drilling fluid needed for performing the cutting method.

In another variant, the effluent is stored in containers for subsequent treatment.

Preferably, but not exclusively, the treatment of the effluent includes a settling step.

In the invention, drilling operations may be performed vertically, horizontally, or indeed in inclined manner relative to the horizontal or to the vertical.

The device for moving the drill tube in its longitudinal direction may, for example, comprise a carriage that carries the drill tube while being slidably mounted on a slideway, which carriage is suitable for generating axial thrust on the drill tube.

Preferably, in order to cut up the mass, a plurality of holes are drilled across the entire thickness of the mass. Also preferably, the drillholes present axes that are substantially parallel to one another.

In a first implementation of the invention, a succession of intersecting drillholes is made in the reinforced concrete mass with the help of the drill tool while causing the drill tube to vibrate, thereby obtaining a continuous line of cut.

The term "intersecting drillholes" is used to mean at least two adjacent drillholes that have cross-sections that present an intersection in common. In other words, the distance between the axes of the two intersecting drillholes is less than the sum of the radii of said drillholes.

It can thus be understood that the succession of intersecting drillholes forms a continuous line of cut through the block, it is specified that the diameters of the drillholes may differ from one drillhole to another.

Advantageously, in the event of one of the drillholes being deflected, a re-boring step is performed on the deflected drillhole by drilling an additional hole in said deflected drillhole, the additional drillhole having a diameter greater than the diameter of the deflected drillhole such that the additional, drillhole intersects one of the drillholes adjacent to the deflected drillhole.

Preferably, a plurality of additional holes are drilled with increasing drill diameters until the last additional drillhole and the adjacent drillhole intersect over their entire length.

In a second implementation, the following steps are performed: drilling at least two primary holes in the reinforced concrete mass with the help of the drill tool by causing the drill tube to vibrate, the primary drillholes being spaced apart from each other and then cutting away the portion of concrete situated between the two primary drillholes, thereby obtaining a continuous line of cut. It can thus be understood that the two primary drillholes do not intersect.

The portion of concrete situated between the two primary drillholes may be cut away, fox example, by performing a diamond wire sawing operation.

Nevertheless, in preferred manner, in order to cut away the portion of concrete situated between the two primary drillholes, at least one secondary hole is drilled in the reinforced concrete mass with the help of the drill tool by causing the drill tube to vibrate, said secondary drillhole being made between the two previously drilled primary drillholes so as to intersect both primary drillholes, whereby the succession of the primary drillholes and of the secondary drillhole intersecting the primary drillholes forms a continuous line of cut in the reinforced concrete mass.

It can thus be understood that the secondary drillhole presents an intersection in common with the previously drilled primary holes.

Advantageously, the diameter of the secondary drillhole is greater than the diameter of the primary drillholes. An advantage is to prevent the drillhole deflecting towards one of the primary drillholes while the secondary hole is being drilled.

Advantageously, in the event of one of the primary drillholes being deflected, after drilling the secondary hole, a re-boring step is also performed of re-boring the deflected primary drillhole by drilling an additional hole in said primary drillhole, said additional drillhole having a diameter greater than the diameter of the primary drillhole such that the additional hole intersects the secondary drillhole.

If necessary, the re-boring step may be repeated until the additional drillhole and the secondary drillhole intersect over their entire length.

Preferably, a series of primary holes is drilled followed by a series of secondary holes, each secondary hole being drilled between two primary drillholes so as to intersect both primary drillholes. Also preferably, the diameters of the secondary drillholes are greater than the diameters of the primary drillholes.

Also preferably, the secondary holes are drilled after the primary holes have been drilled.

This ensures that the intersecting holes are drilled substantially parallel to one another, thereby improving the continuity and the speed with which cutting is performed.

In an advantageous aspect of the invention, at least one of the drillholes is drilled by coring. For this purpose, the cutter member is open.

The core obtained as a result of drilling is broken up in the drill tube because of the vibration. Some of the debris from the core is reduced to a powder state and can thus advantageously foe discharged by the drilling fluid. Thus, unlike prior art methods in which the core remains intact inside the tube and needs to be removed at the end of each drilling operation, the method of the invention enables the step of withdrawing the core from the tube to be omitted. This serves to further improve the speed with which the operation of cutting up the mass is performed.

In an advantageous variant, the drill tool further includes a device for setting the drill tube into rotation, and the drill tube is set into rotation while drilling said at least one hole.

The device for setting the drill tube into rotation may for example comprise a motor-driven rotary head, as well known from elsewhere. The speed of rotation is slower than that used in conventional drilling so as to avoid the above-described risk of tangential deflection.

An advantage of setting the tube in rotation in association with causing it to vibrate is to continuously modify the positions of the cutter teeth relative to the cutting front, so that each tooth travels over the cutting front. This makes it possible to obtain uniform wear of the teeth.

The speed of rotation is slow, preferably lying in the range 10 revolutions per minute (rpm) to 100 rpm.

The rotary torque is preferably measured while drilling is being performed.

More generally, and advantageously, drilling parameters are measured while drilling a first hole in the reinforced concrete mass, and a second hole is then drilled in the reinforced concrete mass after configuring the drill tool with the help of the parameters measured during drilling of the first hole.

The term "configuration" of the drill tool is used to mean the settings of the drill parameters, as well as which cutter member is selected.

The term "drilling parameter" is used to mean specifically but not exclusively: the axial thrust exerted on the cutter member, the frequency of vibration of the drill tube, the rotary torque of the drill tube, the flow rate of the drilling fluid, and the speed of penetration of the cutter member into the mass.

In other words, monitoring the drilling parameters as measured while drilling the first hole makes it possible to obtain an estimate concerning the nature of the materials being drilled, thus making it possible to optimize drilling of the following holes, where necessary by adjusting the drilling parameters and possibly by changing the cutter member.

In this respect, several types of cutter member may be used. The cutter members, commonly referred to as drill bits, are provided with teeth in an arrangement and of shape that vary from one cutter member to another. Generally, the teeth are arranged around the periphery of the end edge of the cutter member.

In an advantageous aspect of the invention, the torque applied to the drill tube while drilling the hole is measured, and any deflection of the drilling direction is detected, by means of the measured torque.

An increase in the value of the rotary torque while drilling is taking place represents an increase in friction along the drill tube, and this may correspond to the cutter member being deflected relative to the desired straight line drilling direction. Thus, measuring rotary torque while performing the drilling operation makes it possible to detect deflection, if any, and possibly also to take corrective measures.

The present invention also provides a method of dismantling buildings of a nuclear power stations that include at least one reinforced concrete mass, wherein said reinforced concrete mass is cut up by implementing the cutting method of the invention.

Finally, the invention provides an installation for cutting tip a reinforced concrete mass by implementing the cutting method of the invention. In characteristic manner, the installation includes a drill tool that comprises:

a drill tube having a longitudinal direction and presenting a distal end carrying a cutter member;

a device for causing the drill tube to vibrate, which device comprises a vibration generator for generating longitudinal vibration in the drill tube;

a device for moving the drill tube along its longitudinal direction; and a device for injecting a drilling fluid into the mass at the distal end of the drill tube;

the installation being arranged to cut up the reinforced concrete mass by drilling at least one hole with the help of the drill tool by causing the drill tube to vibrate with the help of the vibration generator while simultaneously injecting the drilling fluid into the mass at the distal end of the drill tube.

Advantageously, the drilling fluid is foam, water, or air.

In order to confine the dust generated while drilling and entrained by the drilling fluid, the installation of the invention also includes a collector device for collecting the effluent generated while drilling.

Preferably, the collector device comprises an effluent collector fastened to the reinforced concrete mass so as to surround the drill tube, and a treatment device for treating effluent that is connected to the collector and to the device for injecting a drilling fluid into the mass from the distal end of the drill tube.

The treatment device is made so as to separate the debris from the drilling fluid, which drilling fluid is then reinjected after treatment into the borehole. The treatment device may for example comprise a settling tank and/or a filter device.

The advantage of causing the drilling fluid to flow around a closed circuit is to confine the dust and the debris generated by the drilling.

BRIEF DESCRIPTION OF THE DRAWINGS

The invention can be better understood on reading the following description of embodiments of the invention given as non-limiting examples and with reference to the accompanying drawings, in which:

FIG. 1A is a detail view of the distal end of the drill tube;

DETAILED DESCRIPTION OF THE INVENTION

Figure 1:
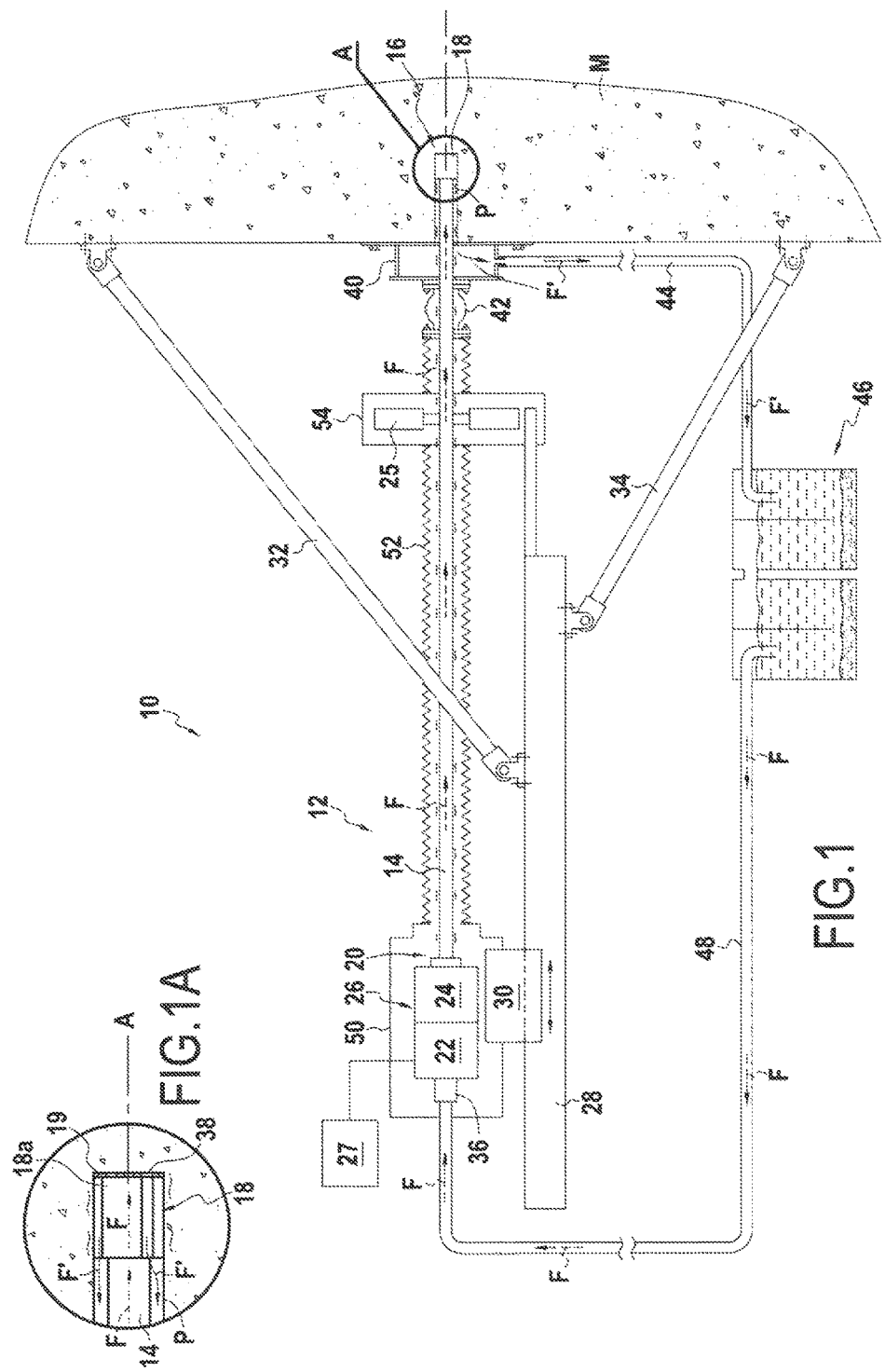
FIG. 1 shows an embodiment of a cutter installation of the invention.

With reference to FIG. 1, the description begins with describing an installation 10 for cutting up a mass M of reinforced concrete. In this example, the mass of reinforced concrete forms part of a containment building of a nuclear power station (not shown) that is to be dismantled.

As described in greater detail below, the installation 10 is configured to perform the cutting-up method in accordance with the present invention.

Figure 2:
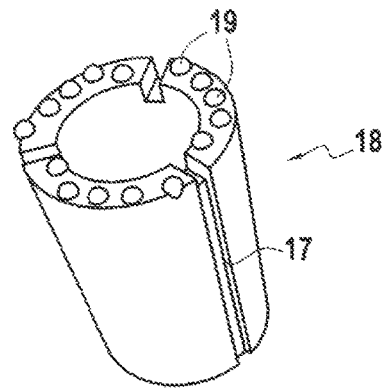
FIG. 2 shows an example of a cutter member of the drill tool of the FIG. 1 installation.

The installation 10 comprises a drill tool 12 having a drill tube 14 extending in a longitudinal direction A. The drill tube 14 presents a distal end 16 that carries a cutter member 18, and a proximal end 20 opposite from the distal end 16. The cutter member 18, shown more clearly in FIG. 2, is open and has a cutter face provided with teeth 19 that extend around an annulus. It also has longitudinal grooves 17 for facilitating the flow of drilling fluid and the removal of excavated debris.

The proximal end 20 of the drill tube 14 is connected, to a device 22 for vibrating the drill tube 14 and to a device 24 for setting the drill tube 14 into rotation. In this example, the device 24 for driving rotation of the drill tube 14 comprises a hydraulic motor, while the device 22 for vibrating the drill tube comprises a vibration generator 22 configured to generate longitudinal oscillations or vibration in the drill tube 14. The longitudinal vibration comprises compression waves that are transmitted along the drill tube 14 to the cutter member 18 situated at the distal end 16 of the drill tube 14.

The hydraulic motor and the vibration generator constitute a drilling head 26 connected to the proximal end of the drill tube 14.

The drill tube 14 and the drilling head 26 are slidably mounted on a slideway 28 to slide in a direction parallel to the desired drilling direction. The drill tool 12 also has a device 30 for moving the drill tube 14 and the drilling head 26 along the longitudinal direction of the slideway 28.

As can be understood with the help of FIG. 1, the slideway 28 that supports the drill tube 14 is fastened to the mass M via arms 32, 34 that are fastened firstly to the slideway 28 and secondly to the mass M. In a variant, the installation could be mounted on a drilling machine, e.g. mounted on crawler tracks, and that is placed in front of the mess without being fastened thereto.

In this example, the installation is configured to make a horizontal drillhole P. Without going beyond the ambit of the present invention, the installation could be adapted to make a drillhole that is inclined relative to the horizontal, or indeed that is vertical.

The slideway is connected to jaws 25 that surround the drill tube 14 and that make it possible in particular to perform operations of adding and removing tube elements making up the drill tube.

The drilling head 26 is powered by a power supply 27 situated remotely.

The installation 10 also has a device 36 for injecting a drilling fluid F into the mass M at the distal end 16 of the drill tube 14. In this example, it can be understood that while drilling is being performed, the drilling fluid F is introduced into the drill tube so as to evacuate the debris excavated by the cutter member 18. The drilling fluid F is introduced into the drill tube via its proximal end in such a manner as to flow along the drill tube and leave it from its distal end. As can be understood with the help of FIG. 1A, the cutter member 18 is open so that the drilling fluid F passes through the cutter member and flows between the cutting front 38 and the cutting face 18a of the cutter member 18. Fluid is thus indeed injected into the mass M at the distal end of the drill tube, using the drill tube as a fluid feed pipe. After being injected at the distal end of the drill tube, the drilling fluid mixes with the excavated debris and flows between the drill tube 14 and the wall of the drillhole P going towards the proximal end of the drill tube 14.

The effluent F' constituted by the drilling fluid F mixed with the excavated debris is collected in an effluent collector 40 that is fastened to the mass H. The effluent collector 40 surrounds the drill tube 14. Sealing between the effluent collector 40 and the surrounding atmosphere is performed by a sleeve valve 42 that is fastened to the collector 40 and that surrounds the drill tube 14 in sealed manner.

As shown in FIG. 1, the effluent F' is taken by a pipe 44 to a treatment device 46, specifically settling tanks 46; these tanks are also connected via another pipe 48 to the device 36 for injecting drilling fluid at the distal end of the drilling tube 14.

It can thus be understood, that the drilling fluid F follows a closed circuit. This recycling advantageously serves to limit the consumption of drilling fluid. In this example, the drilling fluid is water. It could equally well be a foam.

With reference to FIG. 1, it can be understood that the hydraulic motor 24, the vibration generator 22, the device 36 for injecting the drilling fluid, the drill tube 14, and the cutter member 18 constitute a device for cutting up a reinforced concrete mass M by making one or more drillholes P with the help of the drill tool 14 by causing the drill tube to vibrate while simultaneously injecting the drilling fluid F at the distal end 16 of the drill tube 14.

Furthermore, in order to ensure that the drill tube 14 is confined, the drill tool 12 has a first box 50 in which the drilling head 26 is housed. This first box 50 is of the glovebox type so as to enable operators to access the drilling head 26 in leaktight manner.

The drill tool 12 also has a bellows sleeve 52 surrounding the drill tube 14 and extending from the box 50 to the sleeve valve 42. This bellows sleeve is configured to shorten as the drilling advances.

The drill tube 12 also has a second box 54 of the glovebox type. The second box 54 houses the jaws 25. From the above, it can be understood that the cutter installation of the invention is configured so as to enable operators to work in an ionizing environment in complete safety.

Figure 3:
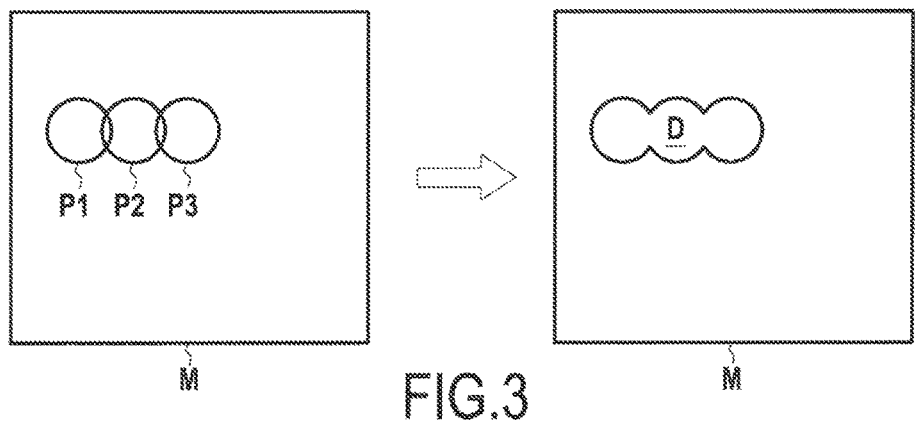
FIG. 3 shows a first implementation of the method of the invention.
Figure 4:
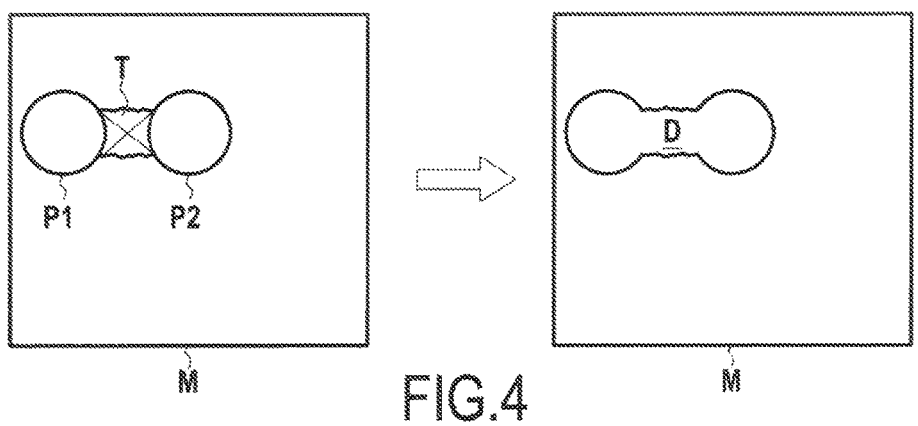
FIG. 4 shows a second implementation of the method of the invention.
Figure 5:
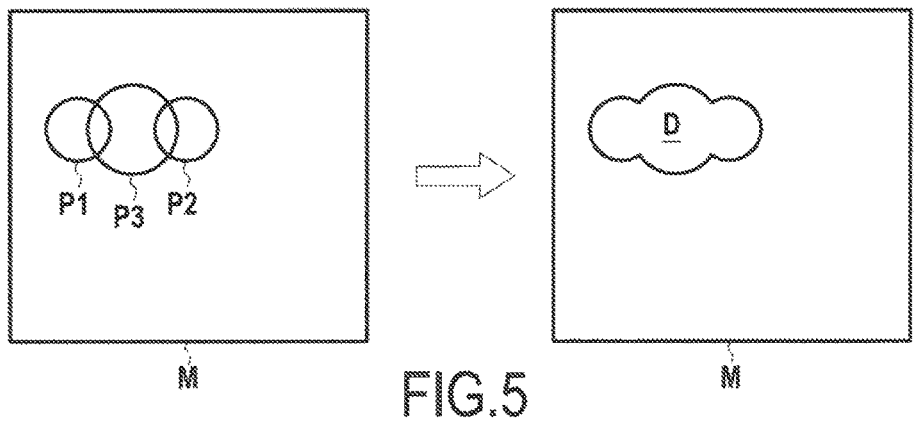
FIG. 5 shows a third implementation of the method of the invention.

With reference to FIGS. 3 to 5, there follows a description of three implementations of the dismantling method of the invention. The dismantling method seeks to deconstruct containment buildings of a nuclear power station comprising one or more masses of reinforced concrete.

These figures show more particularly three implementations of the cutting method of the invention, which method is itself performed in the context of the dismantling method of the invention.

In the first implementation shown in FIG. 3, a succession, of intersecting drillholes P1, P2, P3 is made in the reinforced concrete mass M using the drill tool 12 while causing the drill tube 14 to vibrate, thereby obtaining a continuous line of cut D in the mass M.

In this first implementation, the drillhole P1 is made first, followed by the drillhole P2 so that it intersects the drillhole P1, and then a third drillhole P3 is made intersecting the drillhole P2, so as to obtain a continuous line of cut D.

In the second implementation shown in FIG. 4, at least two primary drillholes P1 and P2 are made in the reinforced concrete mass M using the drill tool 12 by causing the drill tube 14 to vibrate, with the primary drillholes P1 and P2 being spaced apart from each other. In other words, the primary drillholes P1 and P2 do not intersect.

After making two primary drillholes P1 and P2, the portion of concrete T that is situated between the two primary drillholes is cut away. In the example of FIG. 4, this cutting is performed by diamond wire sawing; this then produces a continuous line of cut D as shown diagrammatically in FIG. 4.

The third implementation of the method of the invention is a variant of the second implementation. It differs from the second implementation by the fact that, in order to cut out the portion of concrete T situated between the two primary drillholes P1 and P2, at least one secondary drillhole P3 is made in the reinforced concrete mass M using the drill tool by causing the drill tube to vibrate, said secondary drillhole P3 being made between the two previously-made primary drillholes P1 and P2 so as to intersect both of the primary drillholes, such that the succession of primary drillholes P1 and P2 together with the secondary drillhole P3 intersecting the primary drillholes forms a continuous line of cut D in the reinforced concrete mass M.

In this example, and preferably, the diameter of the secondary drillhole P3 is greater than the diameter of the primary drillholes P1 and P2 specifically, as explained above, so as to prevent the drill tube 14 deflecting in the primary drillhole while drilling the secondary drillhole P3.

In order to obtain a larger diameter, it suffices to replace the cutter member 18 used for drilling the primary holes with a cutter member of greater diameter.

The above-described drilling operations may naturally be repeated so as to obtain continuous lines of cut of longer or shorter length.

Figure 6:
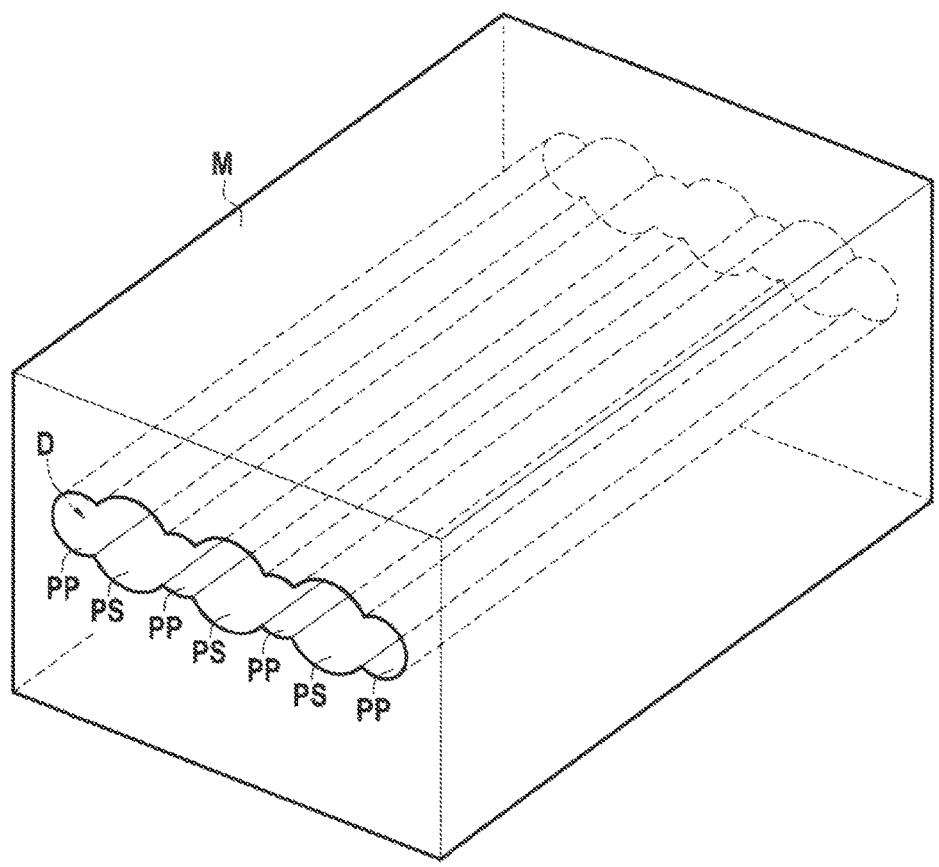
FIG. 6 shows the mass after cutting.

In particular, in FIG. 6, there can be seen a variant of the implementation of FIG. 5 in which a series of primary drillholes PP is made initially followed by a series of secondary drillholes PS, each secondary drillhole being made between two primary drillholes so as to intersect both primary drillholes and thereby obtain a continuous line of cut D. In this example of FIG. 6, the diameters of the secondary drillholes are likewise greater than the diameters of the primary drillholes, once more for the purpose of avoiding the drill tube 14 drifting into one of the primary drillholes while it is drilling the secondary hole.

In the example of FIG. 6, the open cutter member shown in FIG. 2 is used. It can thus be understood that the drillholes are made by coring.

As described above, the effect of vibrating the drill tube is to destructure the major portion of the core inside the drill tube thus enabling it to be removed by the flow of drilling fluid.

In another aspect of the invention, drilling parameters are measured while making a first drillhole in the reinforced concrete mass. For example, the axial thrust exerted on the cutter member, the frequency of vibration of the drill tube, the rotary torque of the drill tube, the flow rate of the drilling fluid, and indeed the penetration speed of the cutter member into the mass M may be measured.

These drilling parameters are analyzed and serve in particular to characterize the structure of the material being bored. These parameters measured while drilling the first hole are then used optionally for configuring the drill tool in order to drill a second hole in the reinforced concrete mass M. For example, the cutter member used for making the first drillhole may be replaced by a cutter member having a structure of different teeth 19; if necessary, the flow rate of the drilling fluid may be adjusted, as can the frequency of vibration of the drill tube or indeed the travel speed of the drill tube along its longitudinal direction A.

Figure 7A:
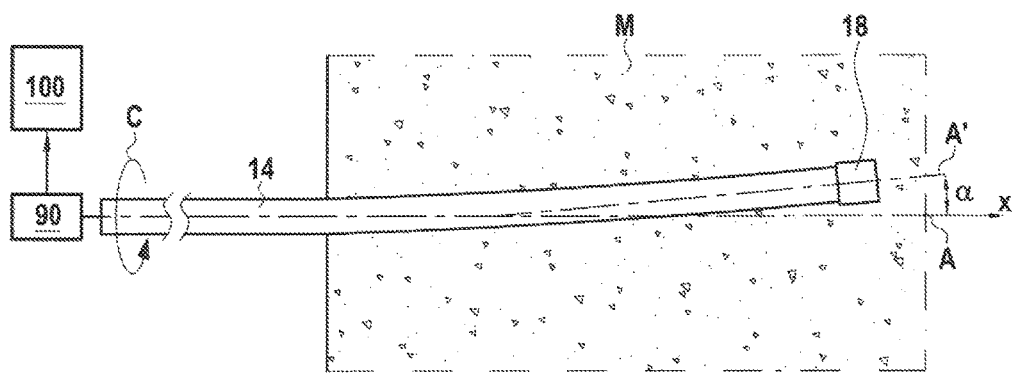
FIGS. 7A and 7B show the performance of the step of detecting possible deflection of the drill tube.

In another advantageous aspect of the invention, the rotary torque C of the drill tube 14 is measured. As shown, in FIGS. 7A and 7B, this measurement of torque C serves to detect potential deflection of the drilling direction. This deflection is represented by the angle α between the desired drilling direction A and the actual drilling direction A'.

For this purpose, the installation also has a device 90 for measuring the torque C and a deflection detector device 100, which devices receive the measured torque value.

Figure 7B:
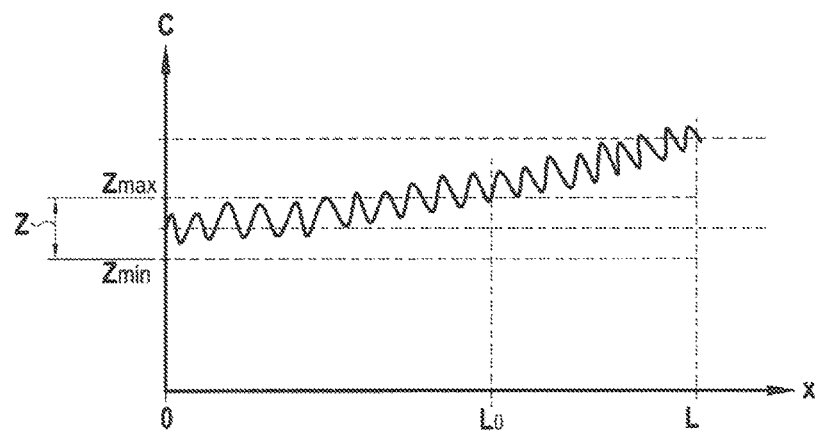

The graph of FIG. 7B shows how the measured torque varies as a function of drilling depth.

Going beyond the upper limit Zmax of the operating band Z leads to an increase in the tangential force to which the drill tube is subjected, which is indicative of deflection.

Consequently, measuring the torque makes it easy to detect any deflection of the drill tube relative to the desired drilling direction.

Figure 8:
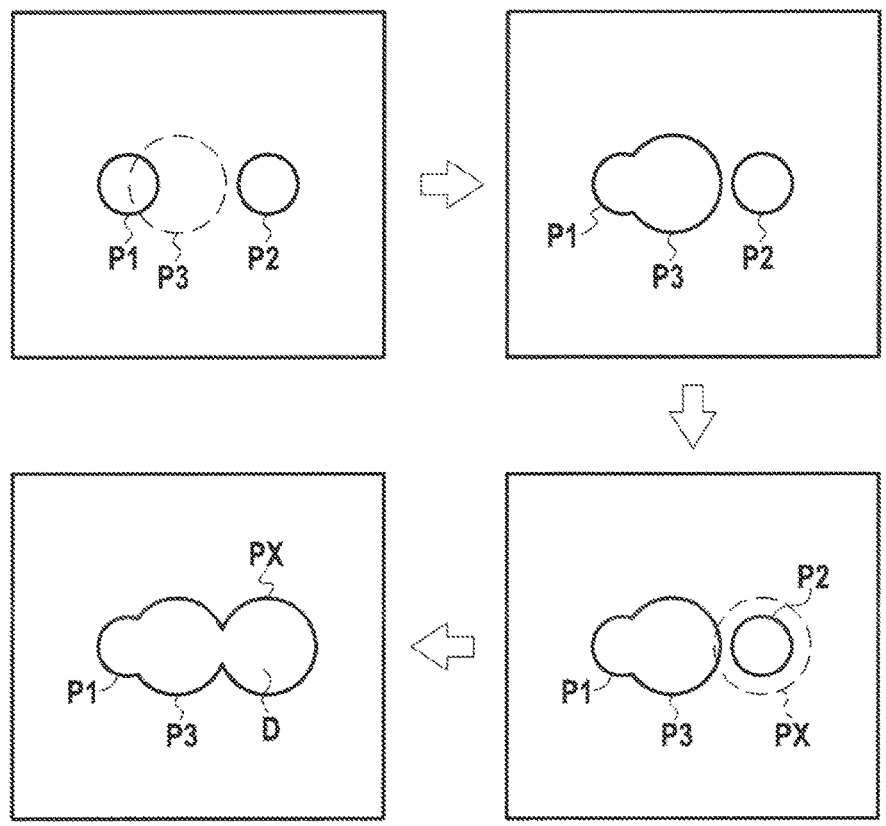
FIG. 8 shows an example of a re-boring step consisting in re-boring one of the primary drill-holes.

If a deflection is detected, e.g. in the second primary drillhole P2, then a re-boring step is performed on the primary drillhole that has become deflected. This re-boring step is shown diagrammatically in FIG. 8.

In this re-boring step, after making the secondary drillhole P3, a re-boring step is also performed by making an additional drillhole PX in said deflected primary drillhole, said additional drillhole PX having a diameter greater than the diameter of the deflected primary drillhole so that the additional drillhole intersects the secondary drillhole.

Figure 9:
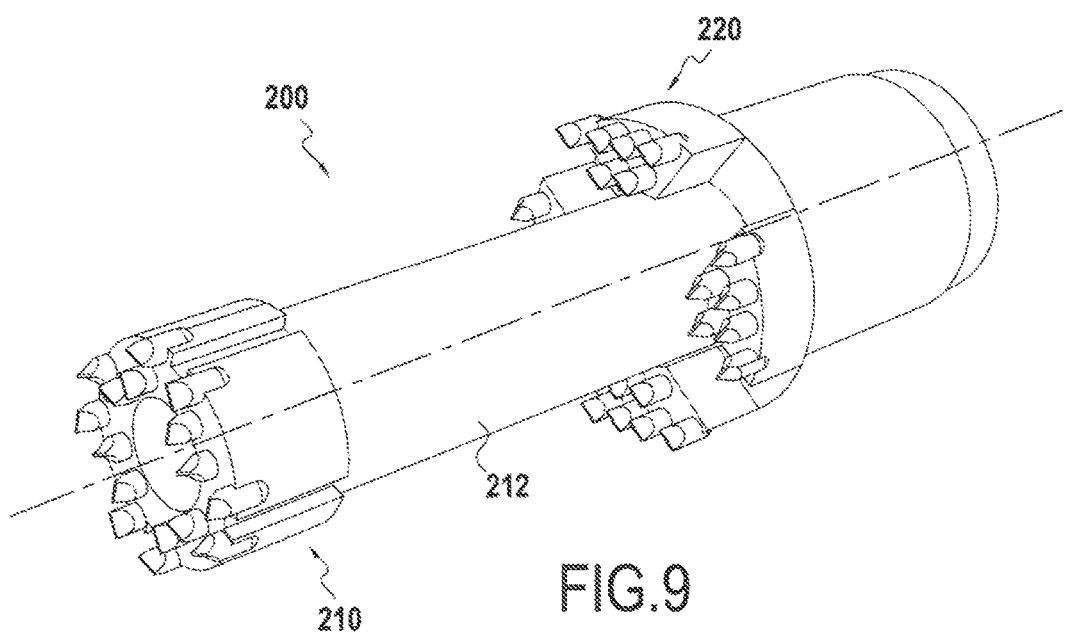
FIG. 9 shows a re-boring member used during the re-boring step.

The additional drillhole PX is made by replacing the cutter member 8 with a re-boring member 200, as shown in FIG. 9. This re-boring member 200 has a first drill bit 210 arranged at the distal end of the re-boring member and presenting a first diameter that is substantially equal to the diameter of the primary drillhole that is to be made. The re-boring member 200 also has a second drill bit 220 arranged axially behind the first drill bit 210. A tubular portion 212 extends between the first drill bit 210 and the second drill bit 220. The second drill bit is in the form of a ring surrounding the tubular portion 212.

As can be seen in FIG. 9, the second drill bit 220 has a second diameter that is strictly greater than the diameter of the first drill bit 210. The diameter of the second drill bit corresponds to the diameter of the additional drillhole PX. It can be understood that the first drill bit 210 and the tubular portion 212 guide the movement of the drill tube in the drillhole P2 that is to be re-bored, while the second drill bit 220 drills the additional drillhole PX of larger diameter. The re-boring member 200 is selected in this example so that the additional drillhole PX intersects the secondary drillhole P3.

Naturally, the re-boring step may be performed on the first primary drillhole or on the secondary drillhole.

Finally, it is specified that the re-boring step may also be performed in the first and second implementations of the cutting method of the invention.

The invention claimed is:

1. A cutting method for cutting up a reinforced concrete mass, the method comprising:
   providing a drilling tool comprising:
      a drill tube having a longitudinal direction and presenting a distal end that carries a cutter member;
      a device for causing the drill tube to vibrate, which device comprises a vibration generator for generating longitudinal vibration in the drill tube;
      a device for injecting a drilling fluid into the mass at the distal end of the drill tube; and
      a device for moving the drill tube in its longitudinal direction;
   cutting the reinforced concrete mass by drilling at least one hole with the help of the drill tool while causing the drill tube to vibrate with the help of the vibration generator and simultaneously injecting the drilling fluid into the reinforced concrete mass at the distal end of the drill tube,
   wherein drilling parameters are measured while drilling a first hole in the reinforced concrete mass, and wherein a second hole is then drilled in the reinforced concrete mass after configuring the drill tool with the help of the parameters measured during drilling of the first hole.

2. The cutting method according to claim 1, wherein a succession of intersecting drillholes is made in the reinforced concrete mass with the help of the drill tool while causing the drill tube to vibrate, thereby obtaining a continuous line of cut.

3. The cutting method according to claim 2, wherein, in the event of one of the drillholes being deflected, a re-boring step is performed on the deflected drillhole by drilling an additional drillhole in the deflected drillhole, the additional drillhole having a diameter greater than the diameter of the deflected drillhole such that the additional drillhole intersects one of the drillholes adjacent to the deflected drillhole.

4. The cutting method according to claim 1, further comprising the steps of:
   drilling at least two primary drillholes in the reinforced concrete mass with the help of the drill tool by causing the drill tube to vibrate, the primary drillholes being spaced apart from each other; and
   cutting away a portion of concrete situated between the two primary drillholes, thereby obtaining a continuous line of cut.

5. The cutting method according to claim 4, wherein, in order to cut away the portion of concrete situated between the two primary drillholes, at least one secondary drillhole is drilled in the reinforced concrete mass with the help of the drill tool by causing the drill tube to vibrate, the secondary drillhole being made between the two previously drilled primary drillholes so as to intersect the two primary drillholes, whereby the succession of the primary drillholes and of the secondary drillhole intersecting the primary drillholes forms a continuous line of cut in the reinforced concrete mass.

6. The cutting method according to claim 5, wherein a diameter of the secondary drillhole is greater than a diameter of the primary drillholes.

7. The cutting method according to claim 5, wherein, in the event of one of the primary drillholes being deflected, after drilling the secondary drillhole, a re-boring step is also performed of re-boring the deflected primary drillhole by drilling an additional drillhole in the primary drillhole, the additional drillhole having a diameter greater than the diameter of the primary drillhole such that the additional drillhole intersects the secondary drillhole.

8. The cutting method according to claim 5, wherein a series of primary drillholes is drilled followed by a series of secondary drillholes, each secondary drillhole being drilled between two primary drillholes so as to intersect both primary drillholes.

9. The cutting method according to claim 8, wherein diameters of the secondary drillholes are greater than diameters of the primary drillholes.

10. The cutting method according to claim 1, wherein at least one of the drillholes is drilled by coring.

11. The cutting method according to claim 1, wherein the drilling fluid is a foam, water, or air.

12. The cutting method according to claim 1, wherein, during drilling, the treated effluent is used as drilling fluid.

13. The cutting method according to claim 1, wherein the drill tool further includes a device for setting the drill tube into rotation, and in that the drill tube is set into rotation while drilling the at least one drillhole.

14. The cutting method according to claim 13, wherein the torque applied to the drill tube while drilling the drillhole is measured, and in that deflection, if any, of the drilling direction is detected by means of the measured torque.

15. A method of dismantling containment buildings of a nuclear power station including at least one reinforced concrete mass, wherein the reinforced concrete mass is cut up by performing the cutting method according to claim 1.

16. An installation for cutting up a reinforced concrete mass by performing the cutting method according to claim 1, the installation including a drill tool comprising:
   a drill tube having a longitudinal direction and presenting a distal end carrying a cutter member;
   a device for causing the drill tube to vibrate, which device comprise a vibration generator for generating longitudinal vibration in the drill tube;
   a device for moving the drill tube along its longitudinal direction; and
   a device for injecting a drilling fluid into the mass at the distal end of the drill tube;
   the installation being arranged to cut up the reinforced concrete mass by drilling at least one drillhole with the help of the drill tool by causing the drill tube to vibrate with the help of the vibration generator while simultaneously injecting the drilling fluid into the mass at the distal end of the drill tube.

17. The installation according to claim 16, wherein the drilling fluid is foam, water, or air.

18. The installation according to claim 16, wherein it further includes a collector device for collecting the effluent generated while drilling the drillholes.

19. The installation according to claim 18, wherein the collector device comprises an effluent collector fastened to the reinforced concrete mass so as to surround the drill tube, and a treatment device for treating effluent that is connected to the collector and to the device for injecting the drilling fluid into the mass from the distal end of the drill tube.

* * * * *